United States Patent [19]
Okutsu et al.

[11] Patent Number: 5,754,908
[45] Date of Patent: May 19, 1998

[54] SHEET FILM PACK WITH A PAIR OF EXTENDED GUIDE RAILS

[75] Inventors: Taro Okutsu; Yasuhiko Kitamura; Hitoshi Komiyama; Katsumasa Okada; Hiromasa Nagai; Yoshio Hara, all of Kanagawa, Japan

[73] Assignee: Fuji Photo Film Co., Ltd., Kanagawa, Japan

[21] Appl. No.: 818,013

[22] Filed: Mar. 14, 1997

Related U.S. Application Data

[62] Division of Ser. No. 528,666, Sep. 15, 1995.

[30] Foreign Application Priority Data

Oct. 7, 1994 [JP] Japan .................... 6-244400

[51] Int. Cl.⁶ .................................................. G03B 17/26
[52] U.S. Cl. ........................ 396/517; 396/518; 396/524
[58] Field of Search ............................ 396/360, 366, 396/367, 372, 511, 512, 513, 517, 518, 524, 525

[56] References Cited

U.S. PATENT DOCUMENTS 5,448,324   9/1995   Okano et al. ..................... 396/518

*Primary Examiner*—Safet Metjahic
*Assistant Examiner*—J. K. Han
*Attorney, Agent, or Firm*—Sughrue, Mion, Zinn, Macpeak & Seas, PLLC

[57] ABSTRACT

A sheet film pack has a pack housing for receiving a plurality of sheet film units in a stack, and a lid for closing an opening of the pack housing, through which a topmost sheet film unit of the stack is placed in an exposure position. The exposure position is defined by an exposure frame of a pack holder which holds the sheet film pack and is attached to a camera. A film recovery mouth for recovering exposed sheet films one after another is formed in a trailing end of the pack housing, and a cap for closing the film recovery mouth and holding the lid in the closed position is removably attached to the pack housing. The lid is guided along guide rails which are formed on lateral sides of the pack housing to slidably hold lateral edges of the lid. The guide rails extend beyond the film recovery mouth such that the trailing ends of the guide rails are placed inside the cap when the cap is attached to the pack housing. A resilient light-trapping ribbon is disposed on a sliding surface of the pack housing for the lid. The ribbon has a free portion which protrudes toward the lid to be resiliently bent by the lid.

11 Claims, 18 Drawing Sheets

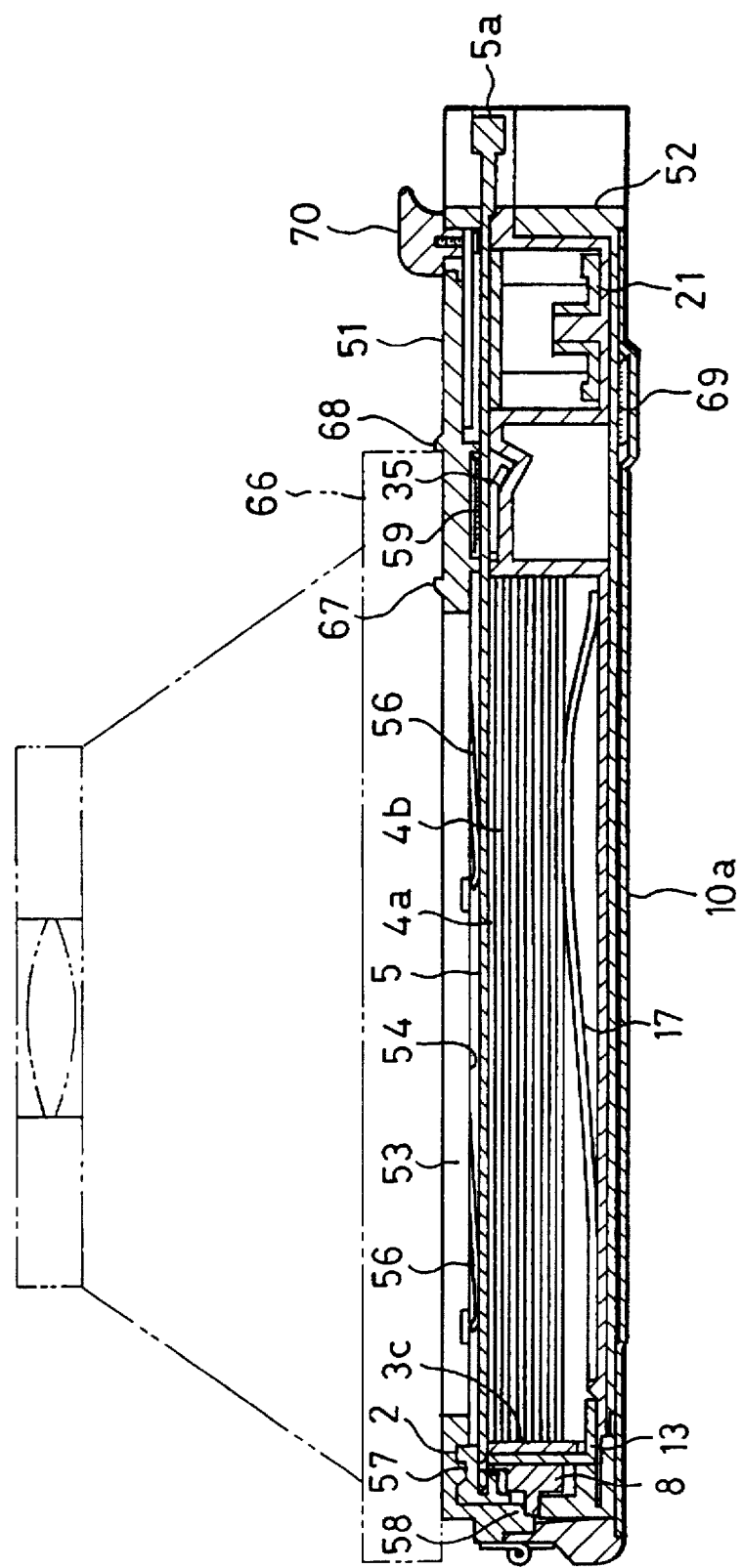

SHEET FILM PACK WITH A PAIR OF EXTENDED GUIDE RAILS

This is a divisional of application Ser. No. 08/528,666 filed Sep. 15, 1995.

BACKGROUND OF THE INVENTION

1. Field of the Invention

The present invention relates to a sheet film pack containing a plurality of sheet films in a stack therein. The sheet films can be exposed in turn with a camera when loaded in a pack holder attached to the camera.

In particular, the present invention relates to a sheet film pack wherein contained sheet film units are reliably shielded from ambient light.

2. Related Art

A sheet film pack contains a plurality of sheet film units which are each constituted of a 4×5 inch sheet of photographic film held in a film sheath. The sheet film units are laid in a stack to be exposed one after another from the top to the bottom. The film pack is loaded in a pack holder which is attached to a large format camera. In the loaded position, a sliding lid of the film pack covering a top side of the stack of the sheet film units is disposed on a front side of the pack holder with respect to the camera.

After loading, the sliding lid is pulled out of the pack holder. Thus, a topmost one of the unexposed sheet film units is moved by a bottom spring of the film pack out through a top opening of the film pack into an exposure position. The exposure position is defined by a front wall of the holder housing. The front wall has an exposure opening formed therethrough. By pushing the lid back into the closed position, the lid thrusts in between the topmost sheet film unit and the next sheet film unit, backing the topmost sheet film unit for exposure.

For example, in a film pack disclosed in U.S. Pat. No. 08/074,634, a separating wall is provided in an inner or trailing end of the film pack, for aligning trailing ends of the sheet film units. A slit or mouth is provided between the separating wall and an inner surface of a bottom wall of the film pack. The sheet film unit placed in the exposure position is fed back to the bottom of the stack through the mouth after the exposure. To close the mouth in a light-tight fashion, a cap is removably fitted to the trailing end of the pack housing.

The cap has claw members inside thereof, which engage in holes of the sliding lid to connect the lid to the cap. When the film pack is loaded in the pack holder and a cover of the pack holder is closed, projections formed on the inside of the cover push the claw members of the cap to disengage them from the lid. Thereby, the lid is allowed to be pulled out for setting the topmost sheet film unit in the exposure position. In the above-mentioned prior art, the cover constitutes the front wall of the pack holder and has the exposure opening formed therethrough.

After making an exposure, the lid is again pulled out. Then, an inner slidable frame of the pack holder is slid out from the holder housing while holding the film pack therein. But the exposed film unit is arrested in the exposure position by an inner ridge of the pack holder. A plurality of plate springs are mounted to the inside of the cover of the pack holder such that the springs push the exposed sheet film unit toward the rear wall of the pack holder with respect to the exposure position.

By pushing the lid back into the initial position again, the film pack and the inner sliding frame are together moved back into the initial position inside the holder housing. At that time, the exposed sheet film unit slips into the bottom of the stack of the sheet film units through the mouth formed below the separating wall. In this way, the film units contained in the film pack may be exposed successively by repeating the above-described reciprocating operation of the sliding lid.

The film pack further has a counter disc for indicating the number of exposures. The counter disc is advanced stepwise responsive to a mechanical advance signal which is generated from a counter advancing mechanism of the pack holder each time the above-described reciprocating operation is executed. The counter disc is accommodated in a cavity. The cavity has a cut-out formed through its bottom wall for receiving the mechanical advance signal and an open top facing the sliding lid. An upper end of a pressing arm is depressed by the sliding lid to push a lower end of the pressing arm against one of claws of the counter disc to prevent reversion of the disc.

Each time the sheet film unit is interchanged after exposure, the cap is once removed from the film pack and then attached to the film pack. Since the removal and the attachment of the cap must be smooth, trailing ends of guided rails, which are formed along both sides of the film pack to guide the sliding lid, are formed to fit with the cap through surface contact.

If ambient light falls directly in a gap between the contact surfaces, the ambient light may be conducted further through a gap between the groove of the guide rail and the lid into the interior of the film pack, fogging the sheet films.

The pressing arm is moved upward while the counter disc is advanced after the last sheet film units is exposed, to be finally engaged in a hole of the lid to lock the lid in its closed position. Because the lid directly depresses the upper end of the pressing arm, the lid is biased upward to provide a gap between the lid and a surface of the film pack for sliding the lid thereon. The gap may conducts ambient light to the interior of the film pack.

Because the cut-out of the counter cavity for receiving the mechanical advance signal is always open, ambient light is easy to enter through it. The light which may enter through the signal receiving cut-out is usually blocked by the lid. But when the lid is pushed up by the pressing arm, the ambient light can reach the sheet film through the gap between the lid and its sliding surface.

To prevent ambient light from entering through the gap between the sliding surface and the lid, a light-trapping plush ribbon is disposed on the sliding surface in the conventional film pack. However, the conventional light-trapping plush ribbon cannot sufficiently block the ambient light when the lid is pushed up.

OBJECTS OF THE INVENTION

In view of the foregoing, a primary object of the present invention is to provide a sheet film pack which is improved in light-tightness for sheet film units contained therein.

SUMMARY OF THE INVENTION

To achieve the above and other objects and advantages, the present invention suggests an improvement wherein the guide rails extend beyond the mouth or the separating wall such that trailing ends of the guide rails, with respect to the direction to open the front opening of the film pack, are inserted in the cap when the cap is fitted to the trailing end of the pack housing.

Another improvement of the invention provides a groove in a sliding surface of the pack housing on which the lid is slid. The groove extends in a direction orthogonal to the lid sliding directions. The groove has a V-shaped section. On one of inclined surfaces of the groove, a part of a light-trapping ribbon is secured, for example, by ultrasonic welding. The light-trapping ribbon is entirely backed with a resilient sheet so that a not-secured remaining part of the ribbon protrudes out of the groove and is inclined relative to the sliding surface. Thus, the light-trapping ribbon is resiliently bent by the lid to be kept in tight contact with the lid.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein:

FIG. 16 is an explanatory view, partly in section, illustrating an initial operating position of the sheet film pack held in the pack holder;

DETAILED DESCRIPTION OF THE PREFERRED EMBODIMENT

Figure 1:
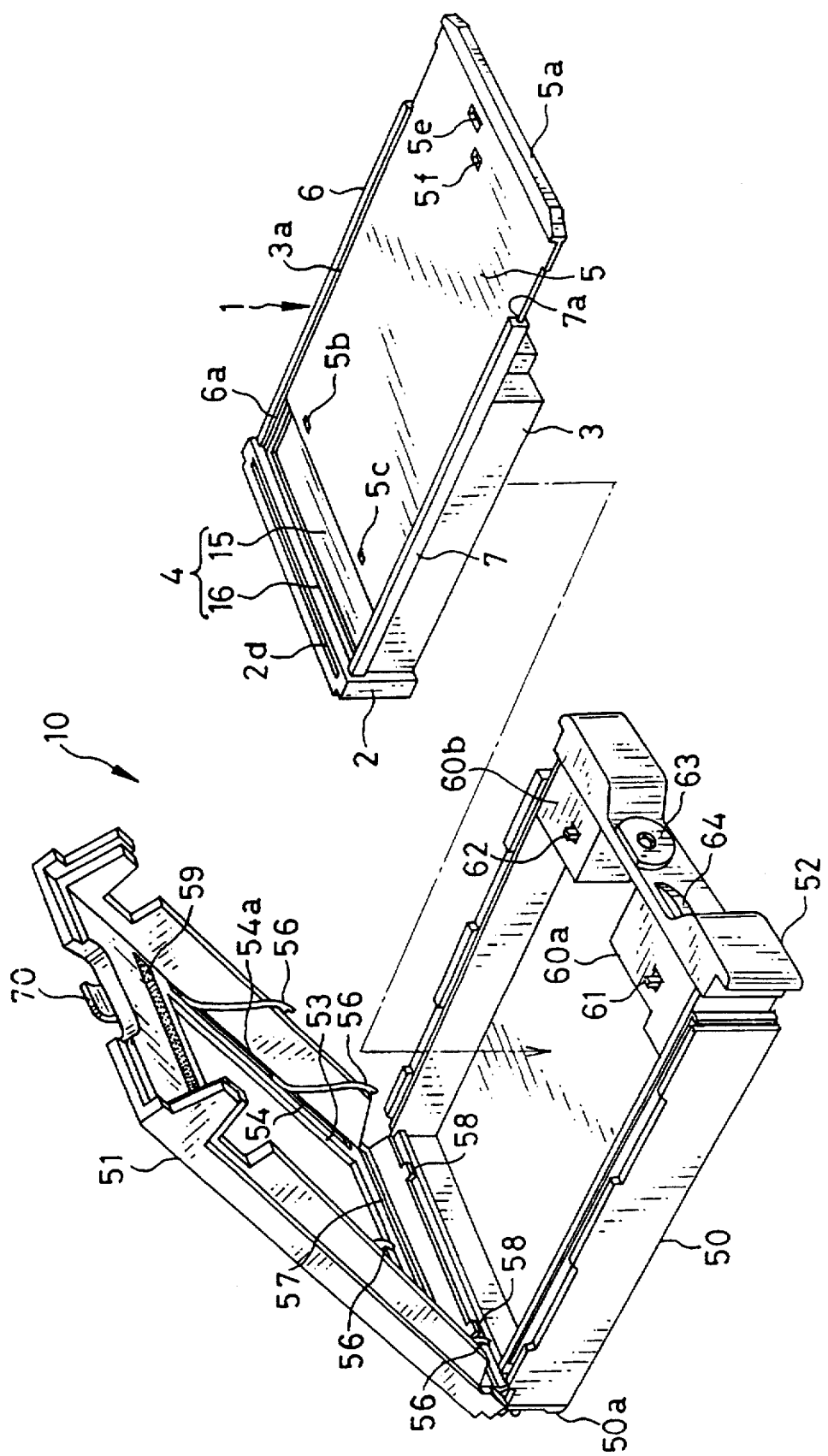
FIG. 1 is a perspective view of a film pack and a pack holder for holding the film pack according to an embodiment of the invention.
Figure 2:
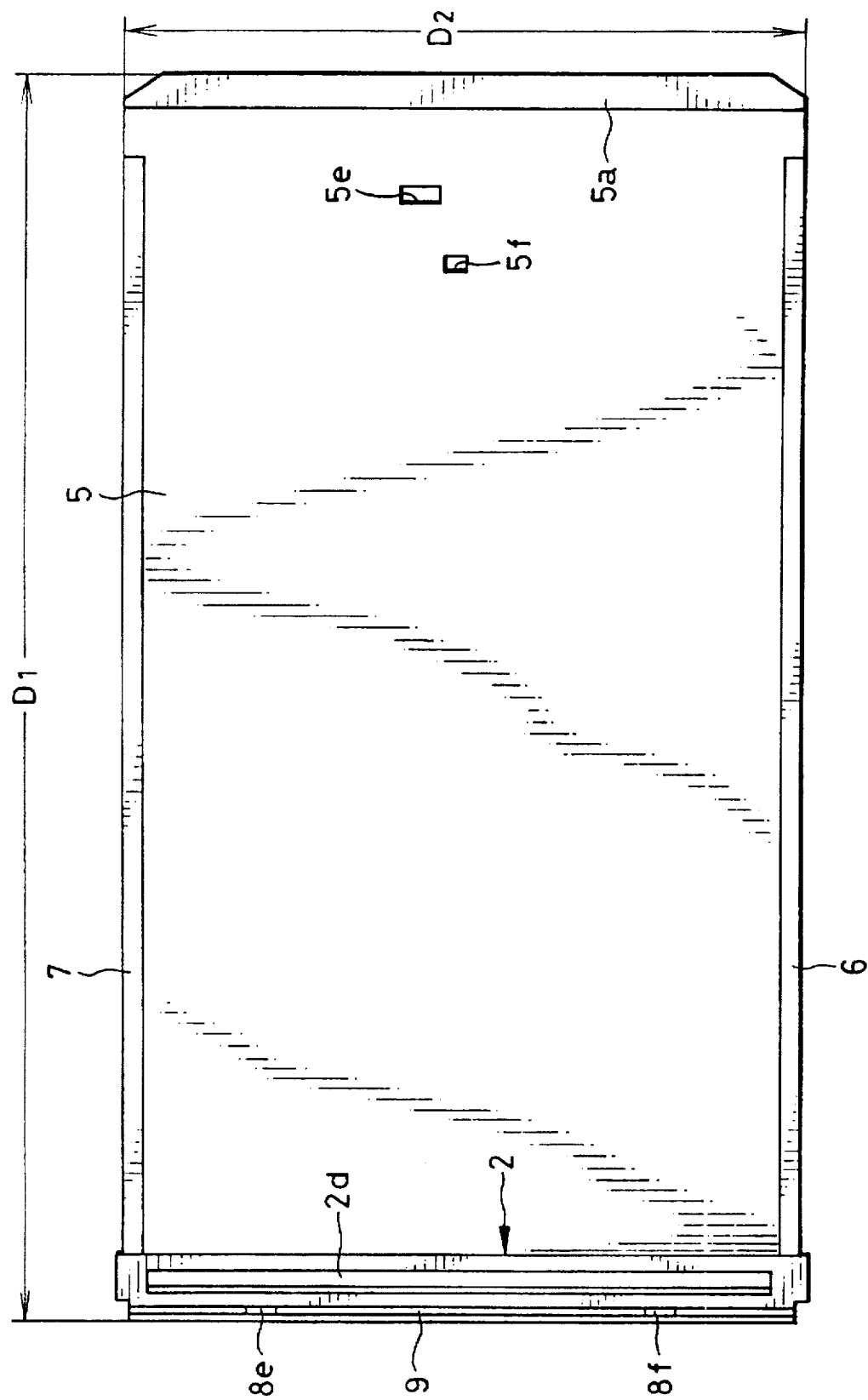
FIG. 2 is a top plan view of the film pack.

In FIG. 1, a film pack 1 is comprised of a pack housing 3 having a cap 2 removably attached to a trailing end of the pack housing 3, a plurality of sheet film units 4 stacked in the pack housing 3, and a sliding lid 5 for opening and closing an opening 3a formed on the front, i.e., the top side in FIG. 1, of the pack housing 3. The sliding lid 5 has a grip 5a on one end thereof that corresponds to a leading end 3g of the pack housing 3 in the closed position. The lid 5 can be slid by hand along channels 6a and 7a of a pair of guide rails 6 and 7 which are formed on the longitudinal side walls of the pack housing 3, so as to pull out the lid 5 or push the same into the film pack 1. External length D1, width D2 and height D3 of the sheet film pack 1 in the closed position of the sliding lid 5 are, for example, 209 mm, 116.6 mm, and 19.9 mm, respectively. Width D4 of the pack housing 3 and height D5 of the cap 2 are, for example, 106.9 mm and 22.6 mm, respectively.

The cap 2 has a fastening member 8 incorporated therein. The fastening member 8 has a couple of claws 8a and 8b on the top edge thereof. The claws 8a and 8b are brought into engagement in holes 5b and 5c formed in the trailing end of the lid 5 to fasten the lid 5 to the cap 2. The fastening member 8 also has two resilient legs 8c and 8d on the bottom thereof, which urge the fastening member 8 upward, i.e., toward the lid 5. The fastening member 8 further has a couple of projections 8e and 8f which protrude perpendicularly to the claws 8a and 8b to the outside of the cap 2 through the holes 2a and 2b. The ends of the projections 8e and 8f in the holes 2a and 2b are aligned with ends of ridges 2c formed on either side of the holes 2a and 2b. Thereby, the projections 8e and 8f are prevented from being accidentally pushed.

As will be described in detail later, when the film pack 1 is loaded in a pack holder 10, the projections 8e and 8f are pushed downward by a corresponding couple of projections formed on the pack holder 10. As a result, the claws 8a and 8b are disengaged from the holes 5b and 5c of the lid 5.

The cap 2 further includes an L-shaped plate 13. A wall portion 13a of the plate 13 encloses the fastening member 8 in the cap 2, and a bottom portion 13b of the plate 13 receives the trailing end of the exposed one of the sheet film units 4 that is ejected from the pack housing 3. Gaps are provided around the plate 13 relative to the external walls of the cap 2, for allowing the trailing end of the lid 5 to access the fastening member 8 inside the cap 2, and for allowing a channel-shaped trailing end portion 3b of the pack housing 3 and tips 6b and 7b of the guide rails 6 and 7 to fit in the cap 2.

A separating wall 3c is disposed inside the trailing end portion 3b, for limiting or aligning the trailing ends of the sheet film units 4 in a film chamber 3d of the pack housing 3. A spacing 14 between the bottom edge of the separating wall 3c and an inner surface of a bottom wall 3e of the pack housing 3 is formed as a recovery mouth 14 for receiving the exposed sheet film unit 4 back into the pack housing.

Figure 6:
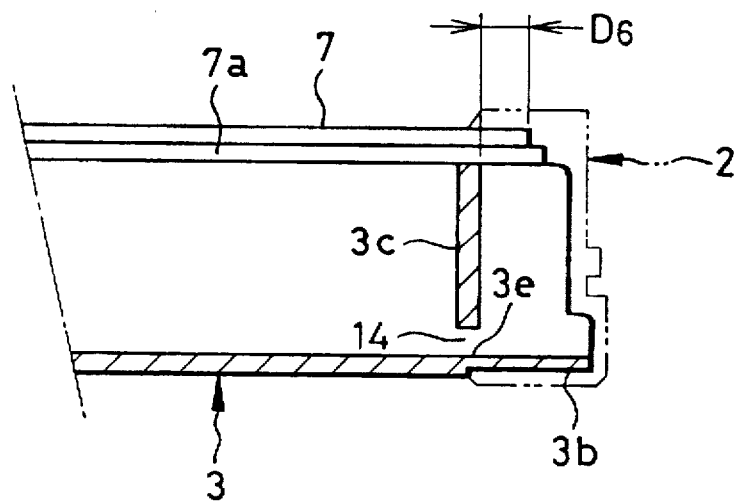
FIG. 6 is a fragmentary view, partly in cross section, of the film pack, illustrating the relationship between guide rails and a cap thereof.

Referring to FIG. 6 illustrating a relationship between the tips 6b and 7b of the guide rails 6 and 7 and the cap 2, the tips 6b and 7b extend beyond the separating wall 3c, such that the tips 6b and 7b are inserted in the cap 2 when the cap 2 is fitted to the trailing end portion 3b of the pack housing 3. Thus, ambient light is prevented from entering through between the tips 6b and 7b and the cap 2. The length D6 of the guide rails 6 and 7 extending beyond the separating wall 3c is determined according test results on light-tightness and performance, as shown in Table 1. It was found preferable to set the length D6 at a value from 3 mm to 7 mm, and more preferably from 4 mm to 6 mm.

| D6 (m) | LIGHT-TIGHTNESS | SMOOTHNESS |
| --- | --- | --- |
| 0 | BAD | GOOD |
| 3 | INSUFFICIENT | GOOD |
| 5 | GOOD | GOOD |
| 7 | GOOD | INSUFFICIENT |
| 9 | GOOD | BAD |

Figure 3:
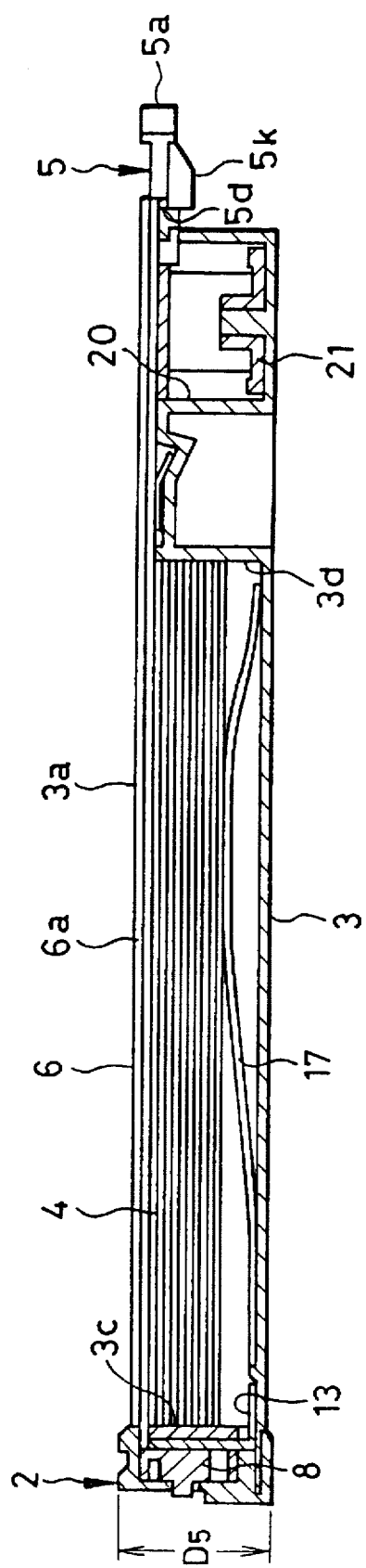
FIG. 3 is a sectional view of the film pack.
Figure 4:
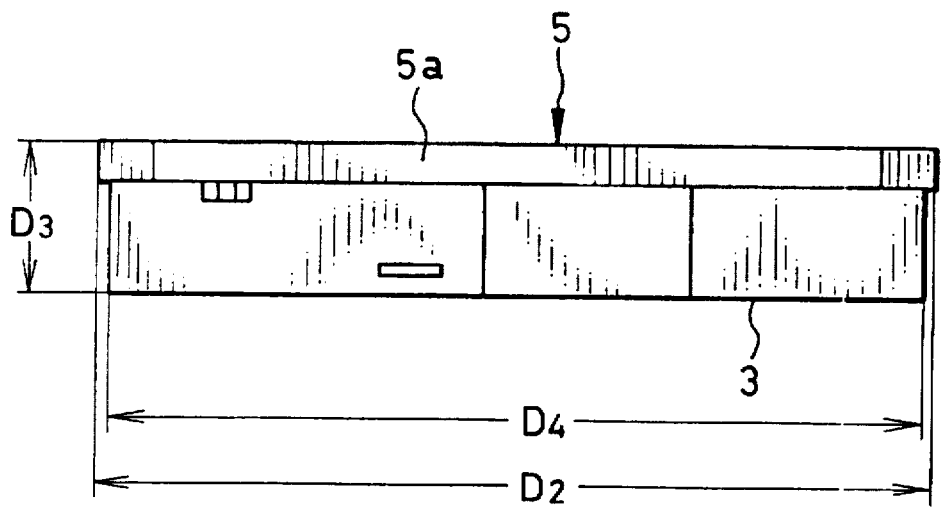
FIG. 4 is a front view of the film pack.
Figure 5:
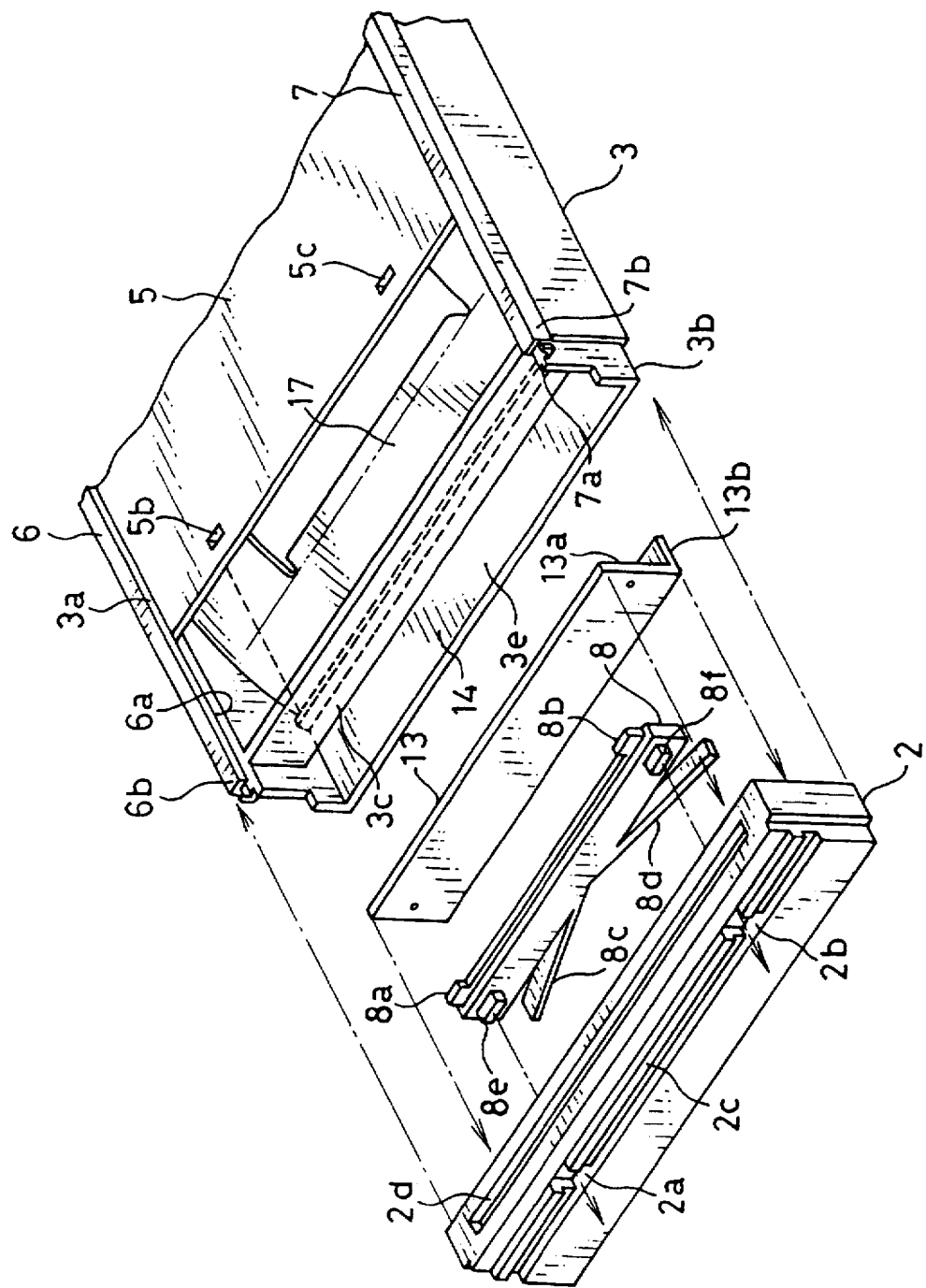
FIG. 5 is an exploded perspective view of a cap of the film pack.
Figure 7:
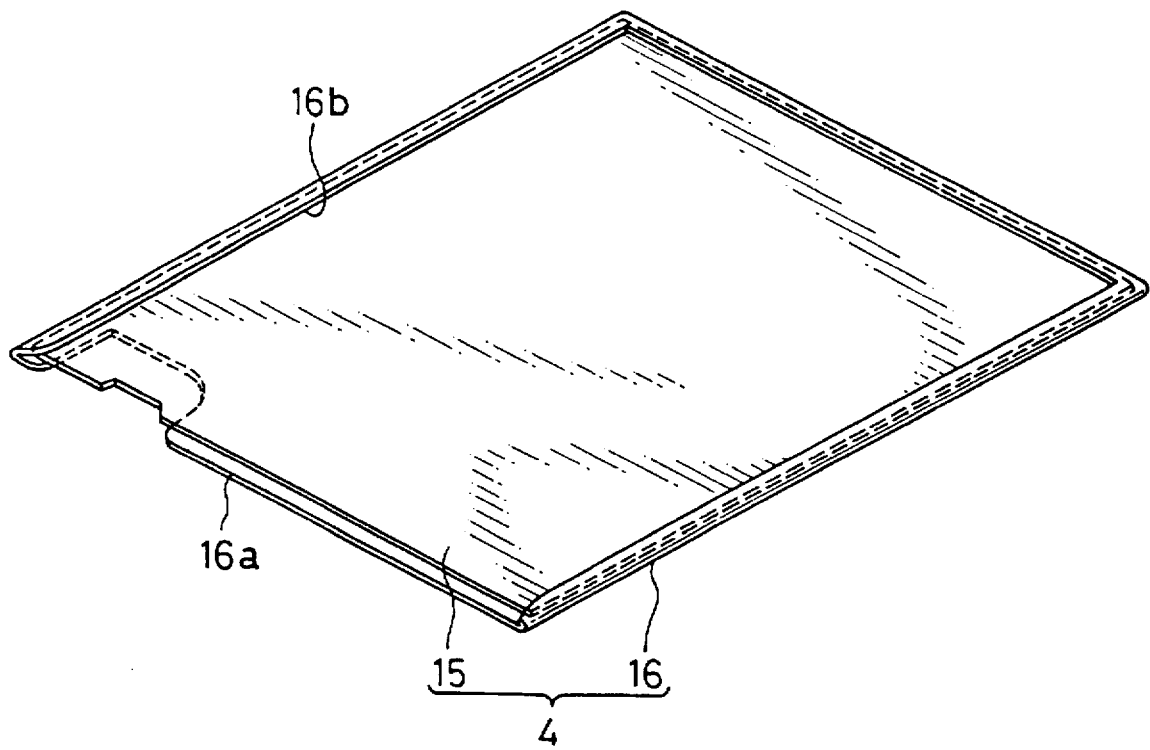
FIG. 7 is a perspective view of a sheet film unit.

The sliding lid 5 has a stepped portion 5d formed on the back side or inside thereof in the vicinity of the grip 5a, as shown in FIGS. 3 and 5. The stepped portion 5d is adapted to strike against the leading end 3g of the pack housing 3, thereby preventing the lid 5 from further moving toward the cap 2. Therefore, when the trailing end of the lid 5 is fastened to the cap 2 by the fastening member 8, the cap 2 cannot slip out of the pack housing 3.

The sheet film unit 4 is constituted of a 4×5 inch sheet film 15 and a sheath 16 mode of a plastic resin sheet. The sheath 16 has a bottom 16a which backs the sheet film 15 on a base surface thereof, and margins 16b which are folded to cover three edges of the sheet film 15.

As shown in FIG. 3, the pack housing 3 holds a plurality of such sheet film units, for example, eight sheet film units 4 stacked or overlaid on one top another. The sheet film units 4 are urged toward the front of the pack housing 3, that is, the top side in FIG. 3, by a plate spring 17 which is secured at one end thereof to the inside of the bottom wall 3e of the pack housing 3, that is, a rear wall of the housing 3 in operating position. Thereby, the top most or front sheet film unit 4a is pressed against the inside surface of the lid 5.

Figure 8:
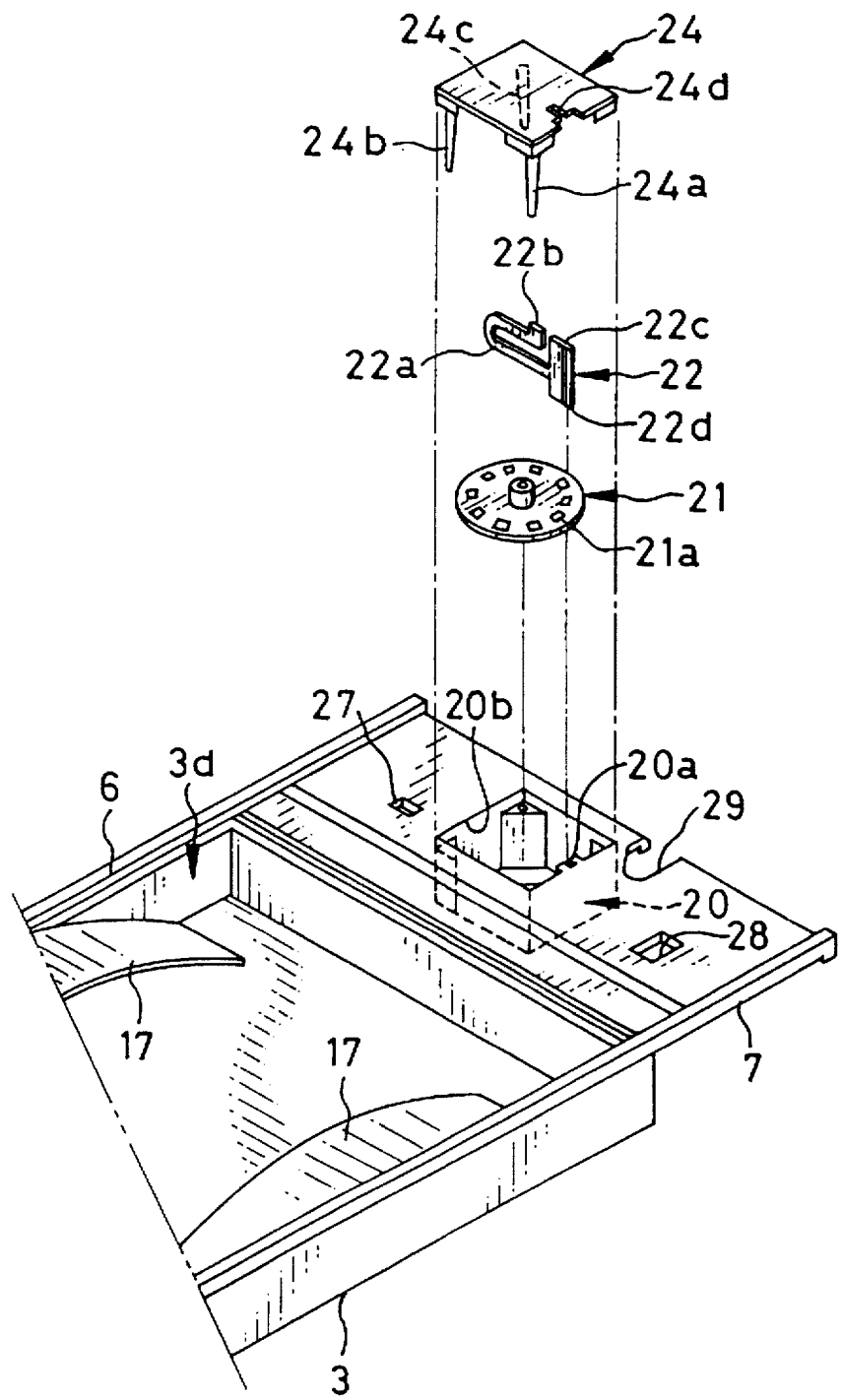
FIG. 8 is an exploded perspective view of a film counter incorporated in the film pack.
Figure 9:
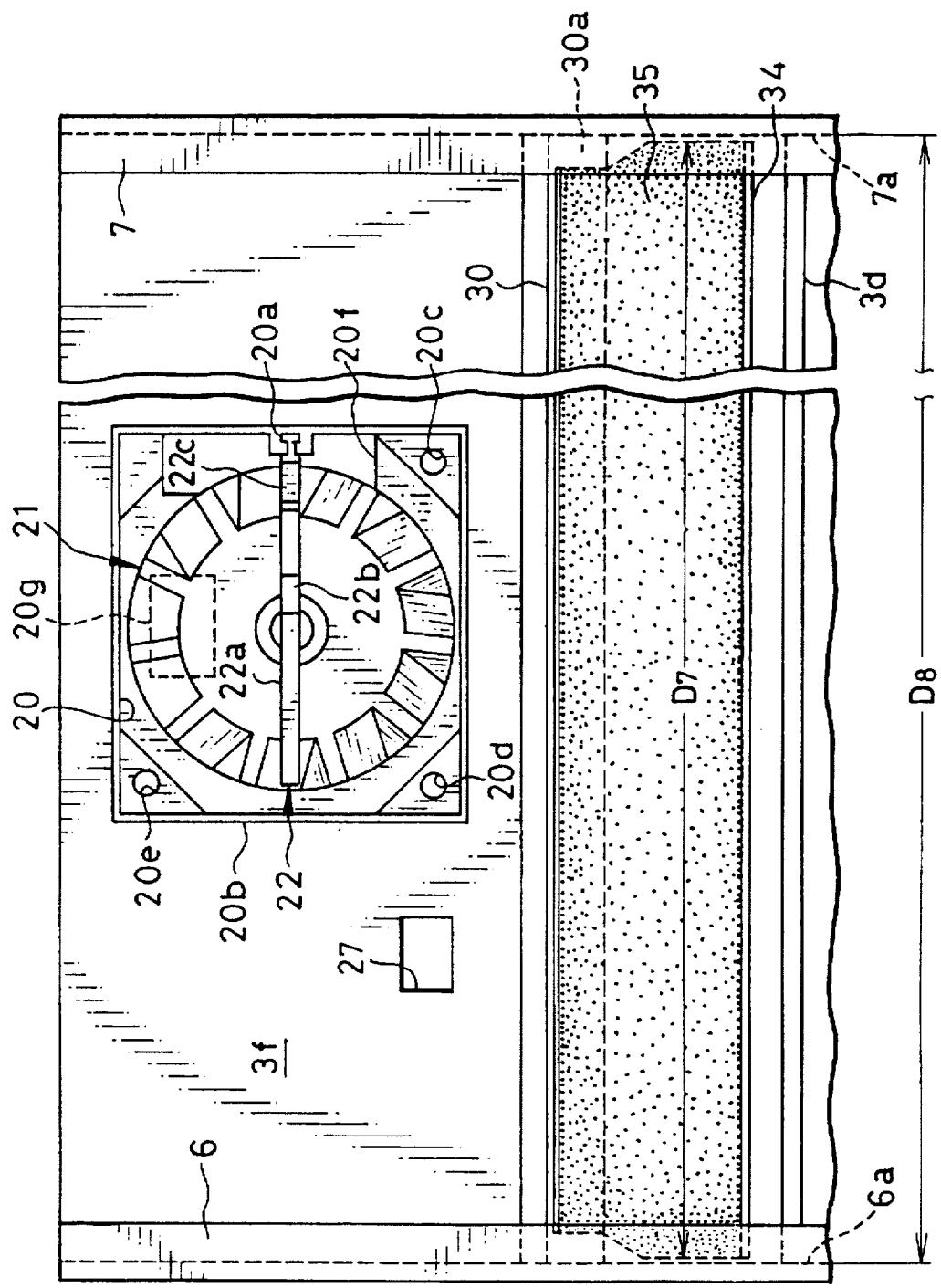
FIG. 9 is an explanatory view illustrating a counter disc accommodated in a cavity of a pack housing of the film pack and a light-trapping member disposed beside the cavity.

As shown in FIGS. 8 and 9, a counter disc 21 is rotatably placed in a rectangular counter cavity 20 of the pack housing 3, and is pressed at the top by a pressing member 22 having a spring arm 22a. The pressing member 22 is guided along a groove 20a formed in the chamber 20. Over the pressing member 22 is disposed a cover plate 24 to cover an open top 20b of the chamber 20. The cover plate 24 has three corner legs 24a, 24b and 24c so that these legs may be inserted in three corner holes 20c, 20d and 20e of the chamber 20. Thus, the cover plate 24 fixedly cover the open top 20b of the chamber 20.

Figure 11A:
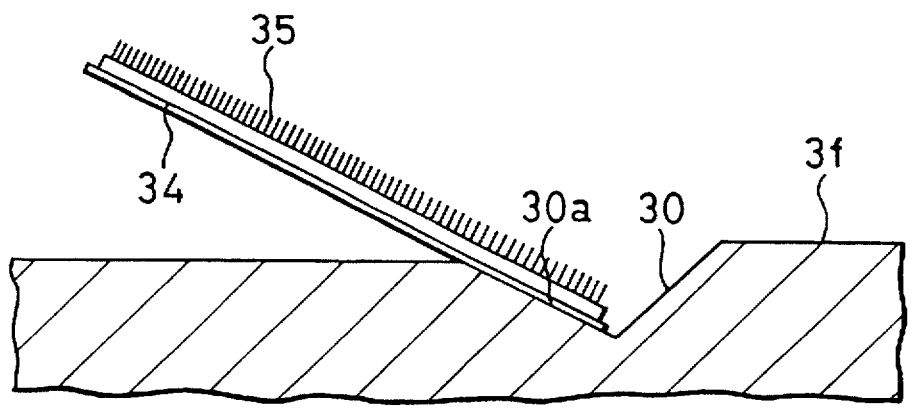
FIG. 11A is an enlarged view illustrating the light-trapping member secured to a groove.
Figure 11B:
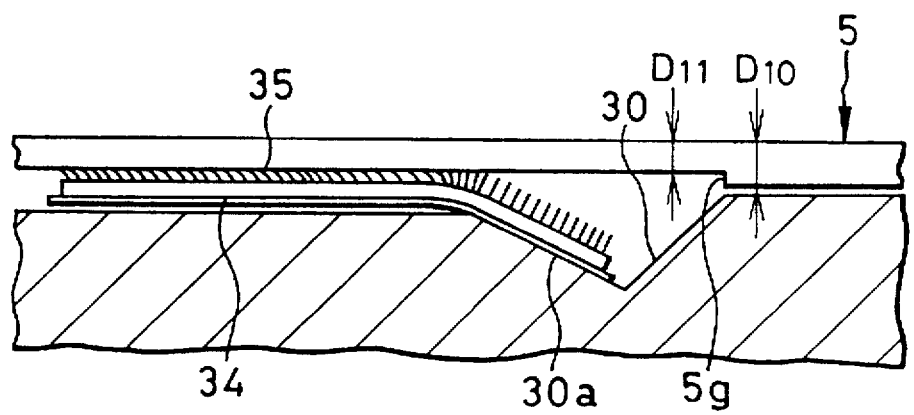
FIG. 11B is an enlarged view illustrating the relationship between the light-trapping member and the lid.
Figure 12:
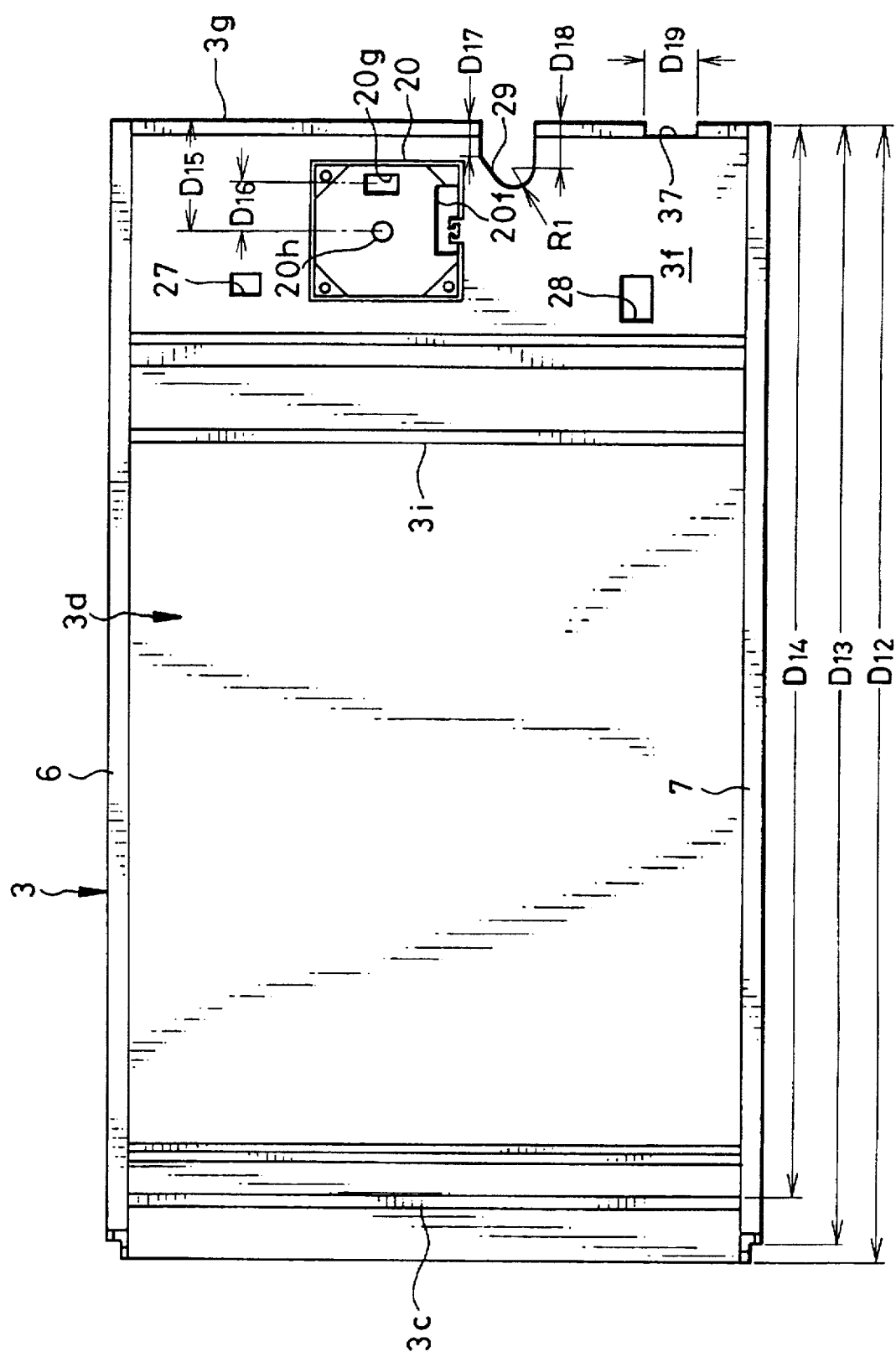
FIG. 12 is a top view of the pack housing.

The cover plate 24 ensures shielding of the sheet film 15 in the pack housing 3 from ambient light which may enter through a cut-out 20f of the counter cavity 20. The cut-out 20f is provided through a bottom wall of the counter cavity 20 for allowing an access of the advancing claw of the counter advancing mechanism of the pack holder 10 to the counter disc 21, as is shown in FIGS. 9 and 12. The cover plate 24 has a cut-out 24d in which an upper end 22c of the pressing member 22 is freely inserted. The amount of light which may enter through a gap between the cut-out 24d and the upper end 22c is very small, and is shielded by a light-trapping plush ribbon 35 provided on a sliding surface 3f of the pack housing 3 to the sliding lid 5, as will be described in detail with reference to FIGS. 9 to 11B. In the shown embodiment, the legs and holes 24a to 24c and 20c to 20e are provided at the three corners so as to provide a room for the cut-out 20f in the fourth corner of the counter cavity 20. It is of course possible to provide four legs in the cover plate 24 and corresponding four holes in the counter cavity 20.

Because one end 22b of the spring arm 22a of the pressing member 22 is constrained by the inner surface of the cover plate 24, a lower end 22d of the pressing member 22 always contacts one of a plurality of claws 21a formed circumferentially on the counter disc 21, so as to prevent reversal of the disc rotation. The anti-reversal claws 21a are provided individually in association with the film number index "1", "2", "3", . . . "8" and an end mark "E". To observe the film number index "1", "2", "3", . . . "8" and the end mark "E" provided on the back of the respective anti-reversal claws 21a, a display window 20g is formed in the bottom of the counter cavity 20.

The anti-reversal claws 21a associated with the film number index are equal in height, except but the claw associated with the end mark "E" is higher than the other claws 21a and has a flat top surface. Thereby, the upper end 22c of the pressing member 22 is maintained spaced a predetermined distance from the inside surface of the lid 5 during the photographing. But when the final sheet film unit 4 has been exposed, the pressing member 22 moves upward to bring the top end 22c into engagement with a hole 5f, so as to secure the lid 5 to the pack housing 3.

Openings 27 and 28 are formed through the pack housing 3 on opposite sides of the counter cavity 20, and a cut-out 29 is formed in the leading end 3g of the pack housing 3 near the counter cavity 20. When the sliding lid 5 is pulled out to open the opening 3a of the pack housing 3 to a full, the holes 5b and 5c are aligned with the openings 27 and 28, so that latch claws of a latch mechanism incorporated into the pack holder 10 are engaged in the holes 5b and 5c through the openings 27 and 28, to stop the sliding lid 5 from being pulled out any farther. The cut-out 29 is adapted to accept a projection formed inside the sliding lid 5, as will be described below.

Figure 10:
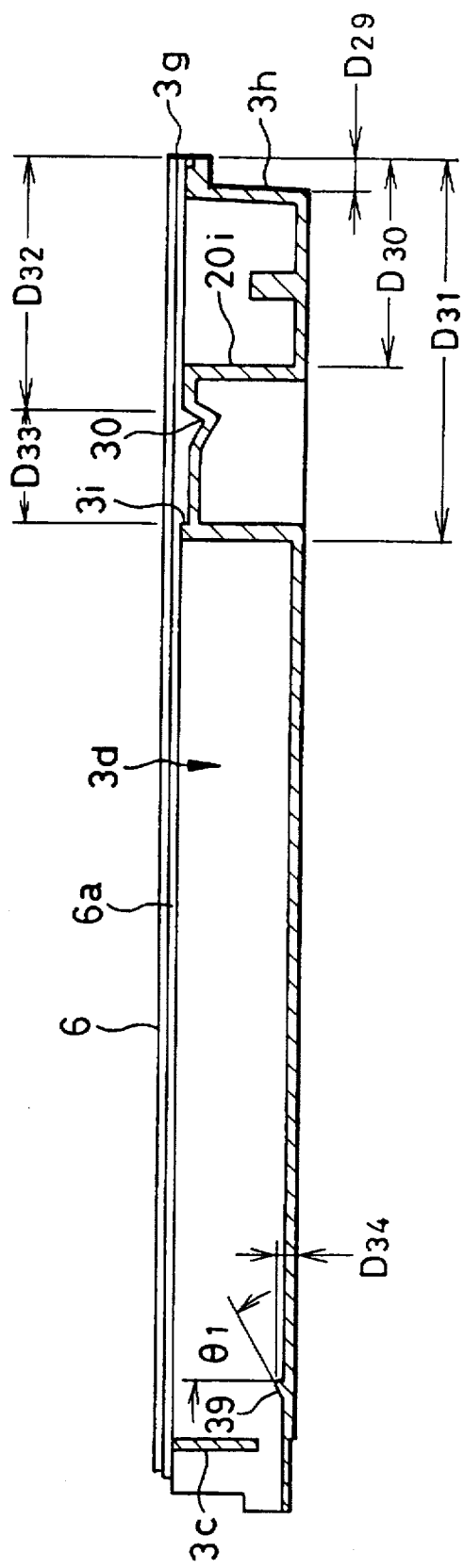
FIG. 10 is a sectional view of the pack housing of the film pack.

As shown in FIG. 10, a V-shaped groove 30 is provided between the film chamber 3d and the counter cavity 20. As shown in FIGS. 11A and 11B, a light-trapping plush 35, which is backed by a resilient sheet 34, is secured by ultrasonic welding to an inclined surface 30a of the groove 30 which is disposed on the side of the film chamber 3d. The resilient sheet 34 gives resiliency to the light-trapping plush 35, and may have the same or a slightly larger width than that of the plush 35. For example, the resilient sheet 34 is made of polyethylene terephthalate (PET).

The widths of the resilient sheet 34 and the plush 35 are so larger than that of the inclined surface 30a that a portion of the plush 35 protruding out of the groove 30 is larger than the portion secured to the inclined surface 30a. When the sliding lid 5 is inserted in the channels 6a and 7a of the guide rails 6 and 7, the protruding portion of the plush 35 is resiliently bent to be biased toward the inner surface of the lid 5, to tightly shield light from entering through the sliding surface 3f of the pack housing 3 and the sliding lid 5.

The resilient sheet 34 and the plush 35 have the same length D7, which is approximately equal to a distance D8 between the channels 6a and 7a of the guide rails 6 and 7. For example, D8 is 109.4 mm, and D7 is 109.2 mm. Thus, the side edges of the resilient sheet 34 and the plush 35 are inserted in the channels 6a and 7a, so that ambient light is prevented from entering through the channels 6a and 7a. The resilient sheet 34 and the plush 35 may each have the same length D7 in either side. But it is preferable to make one side to be secured to the groove 30 have a smaller length than D7 so as to facilitate ultrasonic welding to the inclined surface 30a. The smaller length may preferably be approximately equal to a distance between the guide rails 6 and 7, that is, for example, 107.2 mm.

A stepped portion 5g is formed on the inner surface of the sliding lid 5. As a result, the lid 5 has a thickness D10 on the side of the grip 5a which is larger than a thickness D11 on the other side, as is shown in FIG. 11B. For example, the thicknesses D10 and D11 are 1.2 mm and 1.0 mm, respectively. This construction improves both smoothness of the sliding of the lid 5 and light-shielding property of the lid 5.

Figure 13:
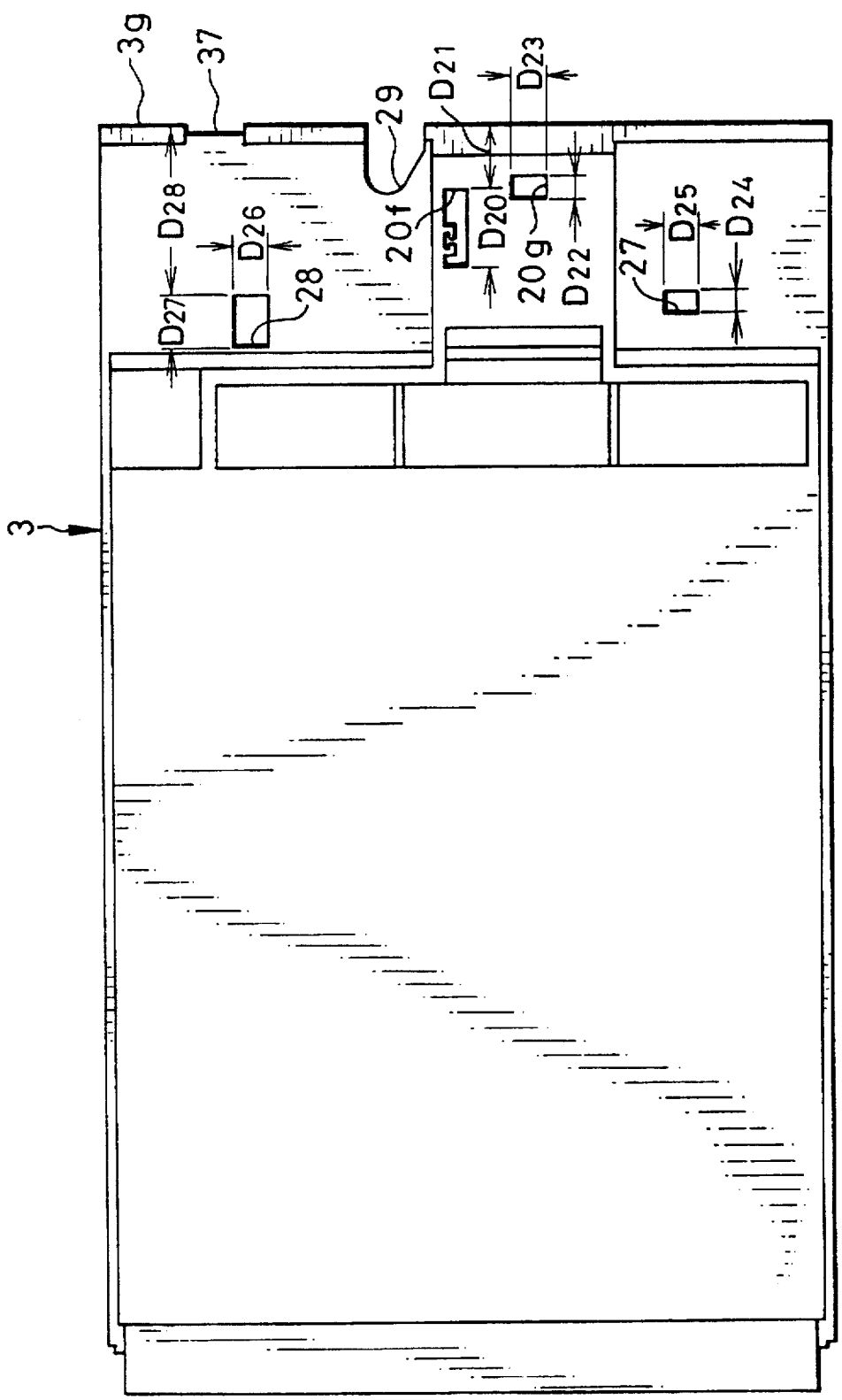
FIG. 13 is a bottom view of the pack housing.

Referring to FIGS. 10, 12 and 13, the pack housing 3 has an external length D12 of 195.0 mm. An entire length D13 of the guide rails 6 and 7 is 191.0 mm, and a length D14 from the leading ends of the guide rails 6 and 7 to the separating wall 3c is 184.5 mm. A boss 20h for rotatably supporting the counter disc 21 is formed in a center of the counter cavity 20. A distance D15 from the center of the boss 20h to the leading end 3g of the pack housing 3 is 18.0 mm, and a distance D16 from the center of the boss 20h to the counter display window 20g is 8.0 mm. The boss 20h has a diameter of 4.0 mm. The cut-out 29 has a difference in length between opposite margins. One margin has a length D17 of 5.0 mm, the other has a length D18 of 7.0 mm. The opposite margins are connected through a straight portion and an arched portion having a radius R1 of curvature (3.5 mm). The leading end 3g further has a recess 37 having a length D19 of 9.0 mm along the leading end 3g.

As shown in FIG. 13, the cut-out 20f has a length D20 of 12.0 mm, and a distance D21 from the leading end 3g of the pack housing 3 to the cut-out 20f is 10.0 mm. The counter display window 20g has a rectangular shape whose shorter side has a length D22 of 3.4 mm and whose longer side has a length D23 of 5.4 mm. Also the openings 27 and 28 are of rectangular-shape, and the side lengths D24×D25 of the opening 27 are 3.6 mm×5.4 mm, whereas the side lengths D26×D27 of the opening 28 are 5.4 mm×8.2 mm. A distance D28 from the leading end 3g to the opening 28 is 25.8 mm.

Referring again to FIG. 10, in relation to the leading end 3g, a distance D29 of an outer surface 3h of the nearest wall of the counter cavity 20 is 5.0 mm, a distance D30 of an inner surface 20i of the opposite wall of the counter cavity 20 is 29.5 mm, a distance D31 of the film chamber 3d is 54.0 mm, and a distance D32 of the groove 30 is 36.0 mm. A distance D33 between the leading end of the groove 30 and another separating wall 3i of the film chamber 3d is 16.0 mm. There is a ridge 39 formed on the inside of bottom wall 3e of the film chamber 3d in proximity to the separating wall 3c, for retaining the end of the plate spring 17. The ridge 39 has a height D34 of 1.0 mm, and an inclined surface on the side of the separating wall 3c. The inclination angle θ1 of the inclined surface to a vertical line to the inner bottom surface is for example 60°.

Figure 14:
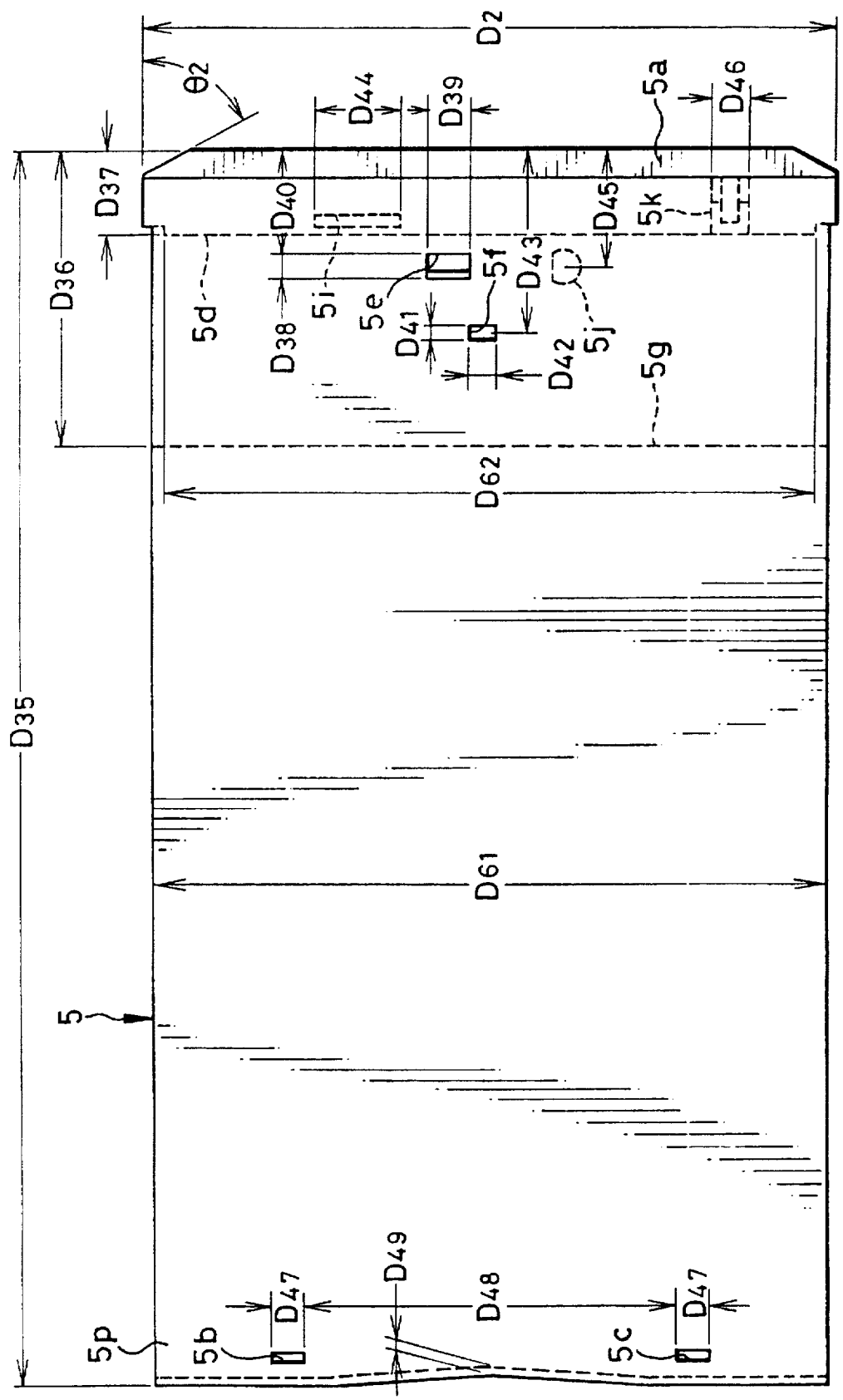
FIG. 14 is a plan view of the sliding lid.
Figure 15A:
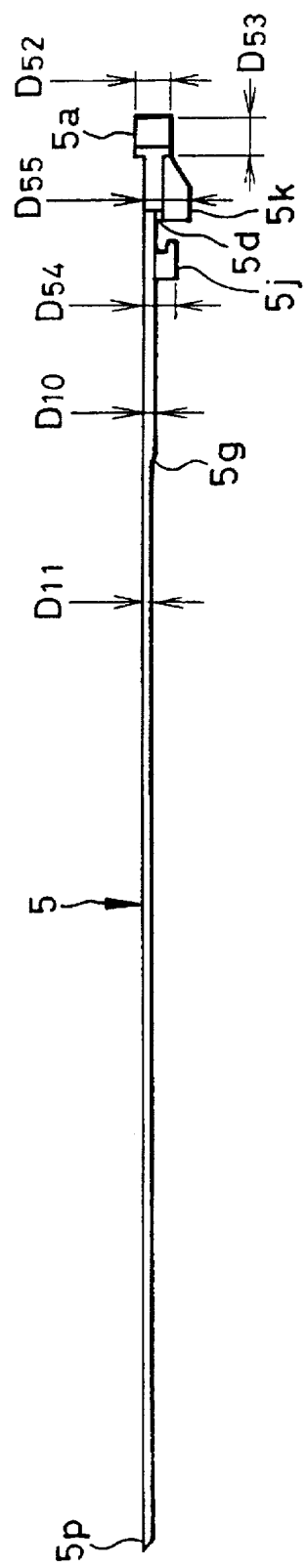
FIG. 15A is a side view of the sliding lid.
Figure 15B:
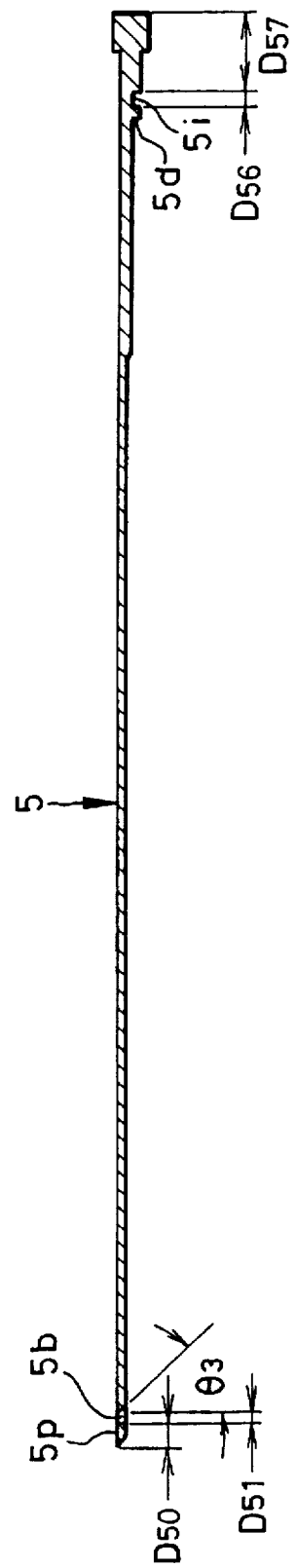
FIG. 15B is a sectional view of the sliding lid.

In FIGS. 14, 15A and 15B illustrating the sliding lid 5, the lid 5 has an entire length D35 of 205.5 mm. A distance D36 from an end face of the grip 5a to the stepped portion 5g is 49.0 mm, and a distance D37 from the end face of the grip 5a to the stepped portion 5d, which is to be stopped against the leading end 3g of the pack housing 3, is 14.4 mm. The lid 5 has a width D61 of 109.2 mm±0.1 mm, and the stepped portion 5g has a width D62 of 104.8 mm. The grip 5a is tapered to decrease its width with an angle θ2 of 60°.

The lid 5 has a rectangular hole 5e for receiving a not-shown claw portion of the knob 70 that is slidably mounted inside the hinged cover 51 of the pack holder 10. The side lengths D38×D39 of the hole 5e are 4.0 mm×7.0 mm. A distance D40 from the end face of the grip 5a to the hole 5e is 18.0 mm. The side lengths D41×D42 of the hole 5f are 2.4 mm×4.4 mm. A distance D43 from the end face of the grip 5a to the hole 5e is 31.0 mm. A slit 5i is formed in the rear surface of the lid 5, for engaging a lock dial 63 (see FIG. 1) therein for locking the lid 5 in the closed position. The length D44 of the slit 5i is 14.0 mm. Also projections 5j and 5k are formed on the rear surface of the lid 5. The projection 5j is received in the cut-out 29 of the pack housing 3, whereas the projection 5k is brought into engagement with the recess 37 of the pack housing 3. A distance D45 of the projection 5j from the end face of the grip 5a is for example 20.0 mm. A width D46 of the projection 5k is for example 6.0 mm.

The projection 5k is provided for pushing a corresponding member of the pack holder 10 for indicating that it is ready for an exposure, as will be described below. The projection 5j is engaged with a corresponding member of the pack holder 10 when it is ready for an exposure, so that the lid 5, the pack housing 3 and a sliding tray 52 of the pack holder will be slid together out of the holder housing 50, as will be described below.

The holes 5b and 5c have a length D47 of 5.6 mm, and are spaced by a distance D48 of 60.4 mm. A trailing end 5p of the lid 5 is tapered in a range having a width D49 of 1.5 mm, for example, by inclining its rear surface. A distance D50 from the trailing end 5p to the holes 5b and 5c is 3.5 mm (see FIG. 15B). The width D51 of the holes 5b and 5c is 1.5 mm. One margin of each hole 5b and 5c which is on the side of the grip 5a is inclined at an angle θ3 of 45° to downwardly, i.e. inwardly, widen the hole 5b or 5c.

The grip 5a has a thickness D52 of 5.0 mm and a width D53 of 5.0 mm. The height D54 of the projection 5j from the upper surface of the lid 5 is 4.4 mm. The height D55 of the projection 5k from the upper surface of the lid 5 is 6.4 mm. The slit 5i has a width D56 of 2.2 mm. A distance D57 from the end face of the grip 5a to the slit 5i is 11.0 mm.

The above described dimensions of the respective parts are preferable examples. The present invention is of course not limited to the above values.

Referring again to FIG. 1, the pack holder 10 is constructed of a holder housing 50, a cover 51 hinged to a trailing end 50a of the holder housing 50, and the sliding tray 52 slidable in the holder housing 50. The hinged cover 51 has an exposure aperture 53 having a smaller size than the sheet film unit 4. The margins of the exposure aperture 53 form reception surfaces 54 for receiving the front surface of the top most one of the sheet film units 4 and for positioning the topmost one 4a of the sheet film units 4 in an exposure-position.

Four leaf springs 56 are mounted to the hinged cover 51 with one end thereof secured to longitudinal grooves 54a formed outside the reception surfaces 54. When the cover 51 is closed after the film pack 1 is loaded in the pack holder 10, the leaf springs 56 urge the film pack 1 rearward, that is, downwards in the drawings, within the pack holder 10. The leaf springs 56 also operate to press the topmost sheet film unit 4a against the lid 5 disposed behind the topmost sheet film unit 4a in the exposure position, as will be described in detail later.

The cover 51 further has a lateral ridge 57 extending in a direction orthogonal to the moving direction of the lid 5, and a couple of projections 58 in the vicinity of the hinge. The ridge 57 is brought into engagement with a lateral groove 2d formed on the top of the cap 2 when the film pack 1 is loaded and the cover 51 is closed. Thereby the cap 2 is arrested in the pack holder 10. The projections 58 push down the projections 8e and 8f of the fastening member 8 also when the cover 51 is closed. Thereby, the claws 8a and 8b are disengaged from the holes 5b and 5c of the sliding lid 5. A light-trapping plush 59 is securely mounted to an inner surface of the hinged cover 51 near the free end of the hinged cover 51 in a direction transverse to the moving direction of the lid 5, for preventing ambient light from entering through a gap between the hinged cover 51 and the sliding lid 5.

Two chambers 60a and 60b, which are formed in a leading end portion of the sliding tray 52, accommodate a latch mechanism for controlling the motion of the sliding tray 52 relative to the holder housing 50, and a counter advancing mechanism for controlling the stepwise advance of the counter disc 21 of the film pack 1. Latch claws 61 and 62 protruding out through the chambers 60a and 60b are adapted to be engaged in the holes 5b and 5c of the sliding lid 5 to stop it in a position where the opening 3a of the pack housing 3 is fully opened.

A lock dial 63 is provided for ensuring the arrest of the sliding lid 5 to the sliding tray 52 when the pack holder 10 loaded with the film pack 1 is carried about. The lock dial 63 may be rotated by hand to engage an arched rim of the dial 63 in a slit 5i of the lid 5 (see FIGS. 14 and 15B). A colored flag, for example, a yellow-colored flag appears in a window formed in a semi-circular tab 64 that is formed beside the lock dial 63, when it is ready for an exposure.

As shown in FIG. 16, the pack holder 10 has positioning ridges 67 and 68 formed on the front thereof to position the pack holder 10 in an exposure frame 66 of a large format camera. A light-trapping plush 69 is provided to prevent ambient light from entering through a gap between a sliding surface of the sliding tray 52 and the holder housing 50.

When the cover 51 is closed after the film pack 1 is loaded in the pack holder 10, the ridge 57 is engaged in the groove 2d to hold the cap 2 between the holder housing 50 and the cover 51. Simultaneously, the projections 8e and 8f are pushed down by the projections 58 to disengage the claws 8a and 8b from the holes 5b and 5c of the lid 5, thereby releasing the lock of the lid 5.

Figure 17:
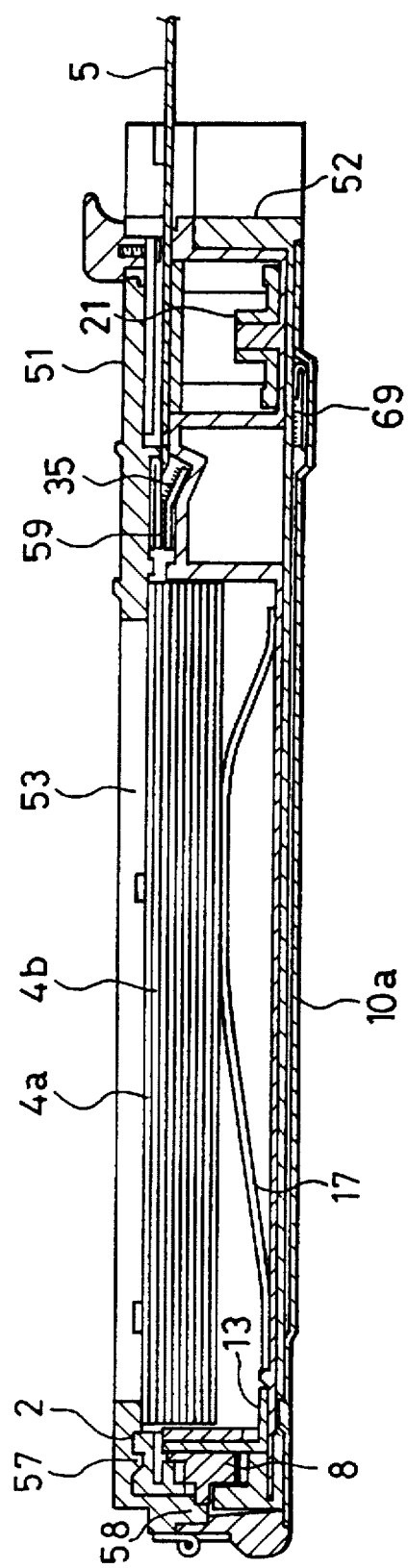
FIG. 17 is an explanatory view, partly in section, illustrating a second operating position of the sheet film pack held in the pack holder, wherein the sliding lid is pulled out.

When the lid 5 begins to be pulled out from the pack holder 10 attached to the exposure frame 66 of the large format camera, to a position shown in FIG. 17, the opening 3a of the pack housing 3 is fully opened, so that the top most sheet film unit 4a is pushed by the plate spring 17 against the reception surface 54 of the pack holder 10, after being ejected through the opening 3a. At that time, the claw 61 is engaged in the hole 5c, so that the lid 5 cannot be pulled out any farther. Also the sliding tray 52 is latched to the holder housing 50 by the latch mechanism mounted in the chamber 60a, so that the sliding tray 52 is prevented from being moved along with the lid 5 relative to the holder housing 10.

Figure 18:
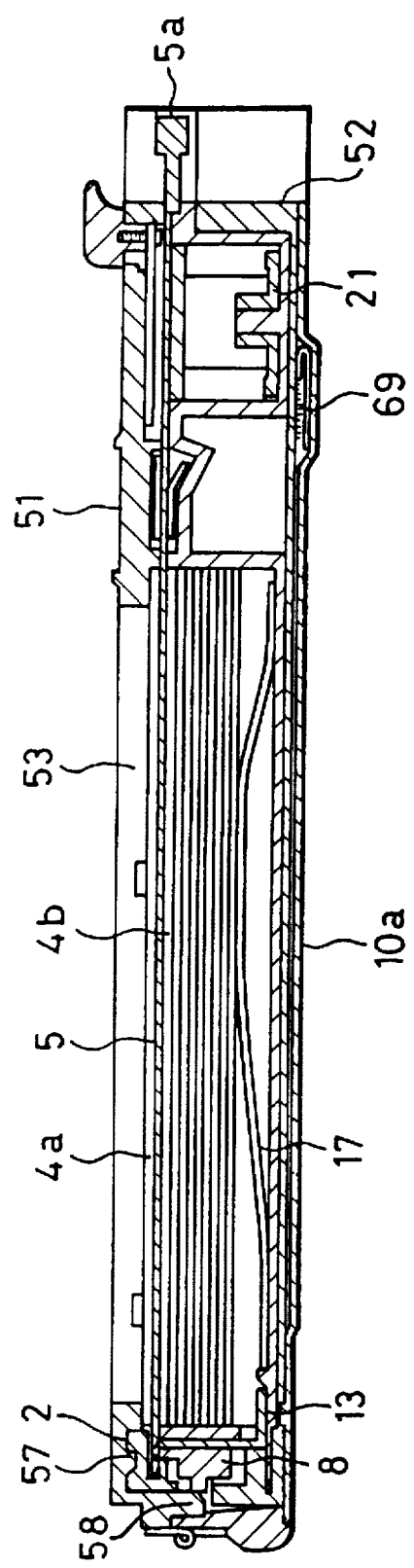
FIG. 18 is an explanatory view, partly in section, illustrating an exposure position of the sheet film pack held in the pack holder.

Thereafter when the lid 5 is moved back to the initial position, as shown in FIG. 18, the lid 5 is inserted between the topmost sheet film unit 4a and the next sheet film unit 4b. Thereby, the sheet film unit 4a is maintained evenly positioned in the exposure position. In this condition, the latch mechanism of the chamber 60a latches the sliding lid 5 to the pack housing 3. Simultaneously, the sliding tray 52 is released from the holder housing 50. Also the flag is displayed in the window of the semi-cylindrical projection 64 for indicating that it is ready for an exposure. A shutter of the large format camera may be released to expose the first sheet film unit 4a.

Figure 19:
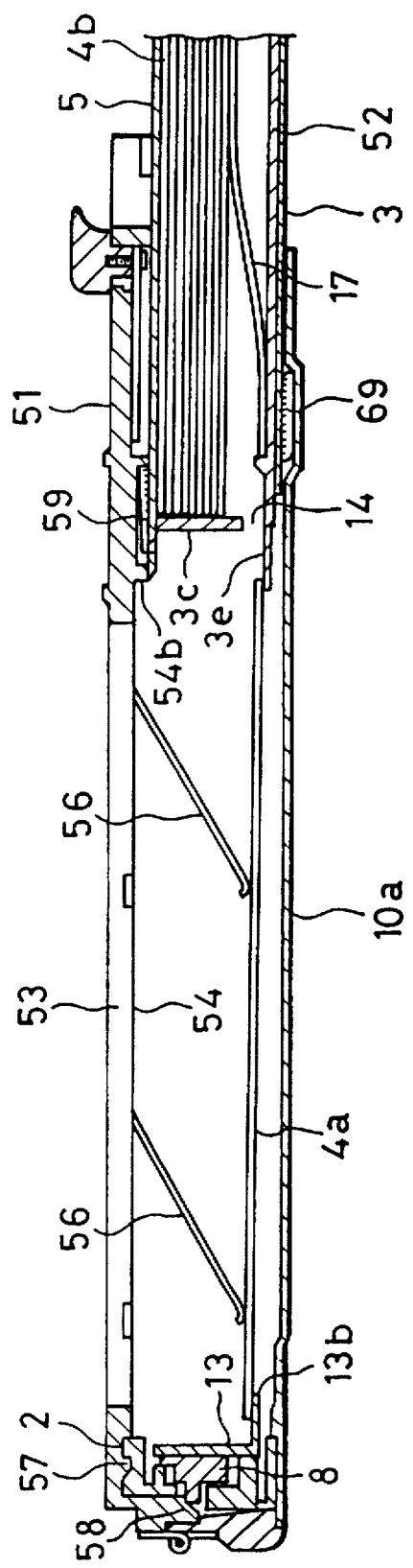
FIG. 19 is an explanatory view, partly in section, illustrating a position after exposure of the sheet film pack held in the pack holder, wherein a sliding tray of the pack holder is pulled out.

After the exposure of the first sheet film unit 4a, the sliding tray 52 and the film pack 1 except the cap 2 are pulled out together from the holder housing 10 by pulling the grip 5a, as shown in FIG. 19. At that time, the exposed first sheet film unit 4a stays in the same position confined by the edges 54b of the reception surface 54. As a result, the exposed sheet film unit 4a is slipped out of the pack housing 3 through a gap between the reception surface 54 and the upper edge of the separating wall 3c.

The sheet film unit 4a is then pressed down to the bottom of the holder housing 50 by the leaf springs 56. Because the lid 5 closes the opening 3a of the pack housing 3, the sheet film units 4 in the pack housing 3 are shielded from ambient light even when the film pack 1 is pulled out from the pack holder 10.

Thereafter when the film pack 1 is pushed into the holder housing 50 together with the sliding tray 52, by pushing the grip 5a, the exposed sheet film unit 4a whose trailing end is limited by the L-shaped plate 13 is inserted back into the pack housing 3 through the recovery mouth 14 between the separating wall 3c and the bottom wall 3e of the pack housing 3. The sheet film unit 4a passing through the recovery mouth 14 rides on the plate spring 17 so as to be placed in the bottom of the stacked sheet film units 4.

When the film pack 1 is completely inserted back into the holder housing 50 in this way, a counter advancing pawl mounted in the chamber 60a meshes with the ratchet 21b of the counter disc 21 through the cut-out 20f of the counter cavity 20 to advance the disc 21 by one scale. As a result, the film number is counted up from "1" to "2" in the counter window 20g. Thus, the sheet film units 4 are set in the same condition as shown in FIG. 16, except the second sheet film unit 4b is placed in the exposure position. The following exposures may be executed in the same way as above.

When the last film unit 4 has been exposed and transported from the exposure position to the bottom of the sheet film units 4, in the same way as described above, all-of the exposed film sheet units 4 are stacked on one top another in the pack housing 3 in order of photographing from the top to the bottom. The lid 5 closes the opening 3a. The counter window 20g displays the end mark "E", and the pressing member 22 is lifted so as to engage the upper end 22c into the hole 5f. Thereby, the lid 5 is prevented from being pulled out. Simultaneously, the lock of the hinged cover 51 is released. Thereby, the cover 51 can be opened by operating a knob 70.

When the cover 51 is opened, the projections 8e and 8f are released from the pressure of the projections 58, so that the fastening member 8 springs up by the force of the resilient legs 8c and 8d. Thereby the claws 8a and 8b are engaged in the holes 5b and 5c so as to join the cap 2 to the lid 5. Because the stepped portion 5d of the lid 5 is engaged with the leading end portion of the pack housing 3, the cap 2 is thus fastened to the pack housing 3. Also the pressure of the ridge 57 on the cap 2 is released, enabling the used film pack 1 to be removed from the pack holder 10.

Although the present invention has been described with respect to the preferred embodiment shown in the drawings, the present invention is not to be limited to the above-described embodiments. On the contrary, various modifications may be possible without departing from the scope and spirit of the invention as defined in the appended claims.

For example, the light-trapping plush 35 may be adhered to the inclined surface 30a of the groove 30 by hot melting adhesive agent or the like, instead of ultrasonic welding.

What is claimed is:

1. In a sheet film pack comprising:
   a pack housing for receiving a plurality of sheet film units in a stack therein;
   an opening formed in one side of said pack housing for placing a topmost one of said sheet film units in an exposure position through said opening;
   a lid slidable relative to said pack housing between a closed position for closing said opening in light-tight fashion and an open position opening said opening;

a film recovery mouth formed in said pack housing at a trailing end thereof with respect to a direction to slide said lid toward said open position; and a cap removably attached to the trailing end of said pack housing so as to close said film recovery mouth, said cap catching said lid so as to arrest said lid in said close position when said cap is attached to said pack housing; the improvement comprising:

a pair of guide rails formed on lateral sides of said pack housing to guide said lid to slide on said pack housing, said guide rails extending beyond said film recovery mouth such that trailing ends of said guide rails are placed inside said cap when said cap is attached to said pack housing.

2. A sheet film pack as recited in claim 1, wherein said cap is removed from said pack housing when said sheet film pack is completely loaded in a pack holder having an exposure frame, said pack holder being removably attached to a camera with said exposure frame disposed behind a taking lens of said camera.

3. A sheet film pack as recited in claim 2, wherein said topmost sheet film units is fed after exposure from said exposure position into a bottom of said stack through said film recovery mouth by reciprocating movement of said lid relative to said pack holder.

4. A sheet film pack as recited in claim 3, wherein each of said guide rails has a channel for slidably receiving a lateral edge of said lid.

5. A sheet film pack as recited in claim 4, wherein a wall is provided along the trailing end of said pack housing to confine trailing ends of said sheet film units laid in the stack, said film recovery mouth being defined by a bottom edge of said wall and a bottom wall of said pack housing.

6. A sheet film pack as recited in claim 4, wherein each of said guide rails extends beyond said film recovery mouth by a length from 3 mm to 7 mm.

7. The sheet film pack as recited in claims 1 further comprising:

a counter disc for counting the number of exposed sheet film units.

8. The sheet film pack as recited in claim 7 further comprising:

a cavity formed in said pack housing beside said stack of said sheet film units, said cavity mounting said counter disc rotatably therein and having an opening in a side facing said lid.

9. The sheet film pack as recited in claim 1 further comprising:

a counter disc for counting the number of exposed sheet film units;

a cavity formed in said pack housing beside said stack of said sheet film units, said cavity mounting said counter disc rotatably therein and having an opening in a side facing said lid;

a cut-out formed through a wall of said cavity to transmit an external mechanical advance signal to said counter disc, said counter disc being rotated by one unit of indicia upon each receipt of said external mechanical advance signal; and a cover plate closing said opening of said cavity to prevent external light from traveling through said cavity into an interior of said pack housing.

10. A sheet film pack as recited in claim 9, wherein said cover plate has legs in corners thereof, said legs extending inward said cavity being fitted in holes formed in corners of said cavity, to fixedly position said cover plate.

11. A sheet film pack as recited in claim 9, wherein said external mechanical advance signal being outputted responsive to reciprocating movement of said lid.

* * * * *